June 13, 1961 — H. L. BARNES — 2,987,933
PULLEY
Filed Jan. 11, 1960 — 2 Sheets-Sheet 1
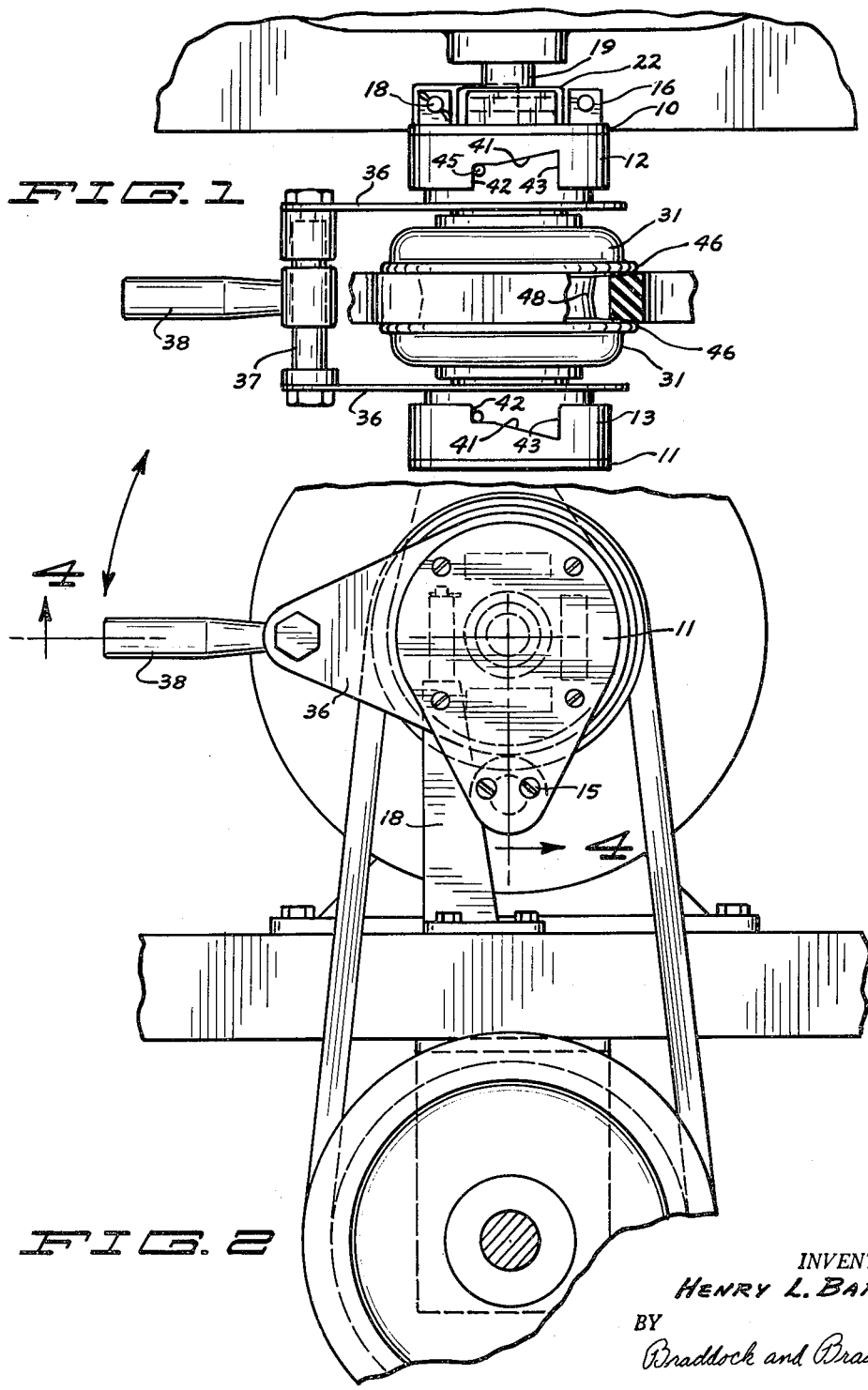
INVENTOR.
HENRY L. BARNES
BY
Braddock and Braddock
ATTORNEYS June 13, 1961  H. L. BARNES  2,987,933
PULLEY
Filed Jan. 11, 1960  2 Sheets-Sheet 2
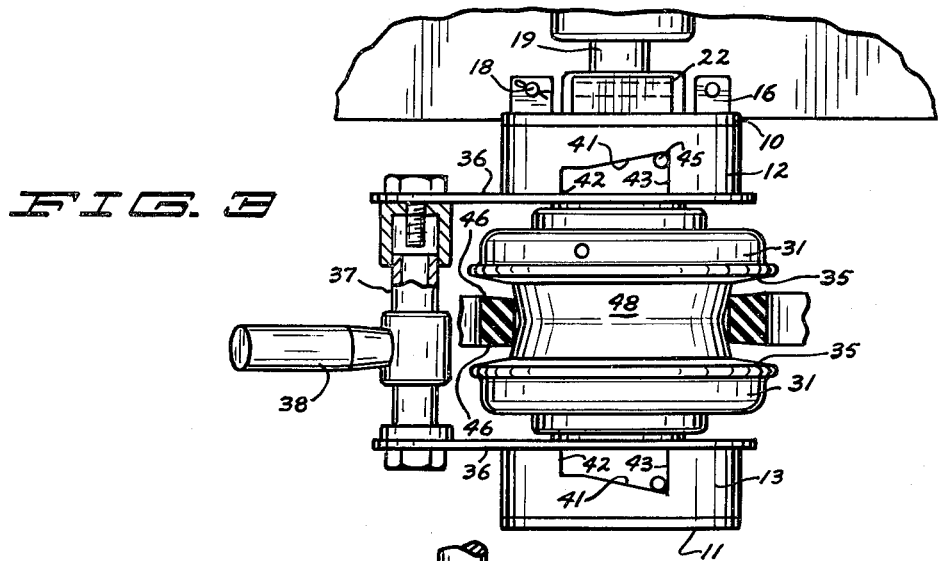
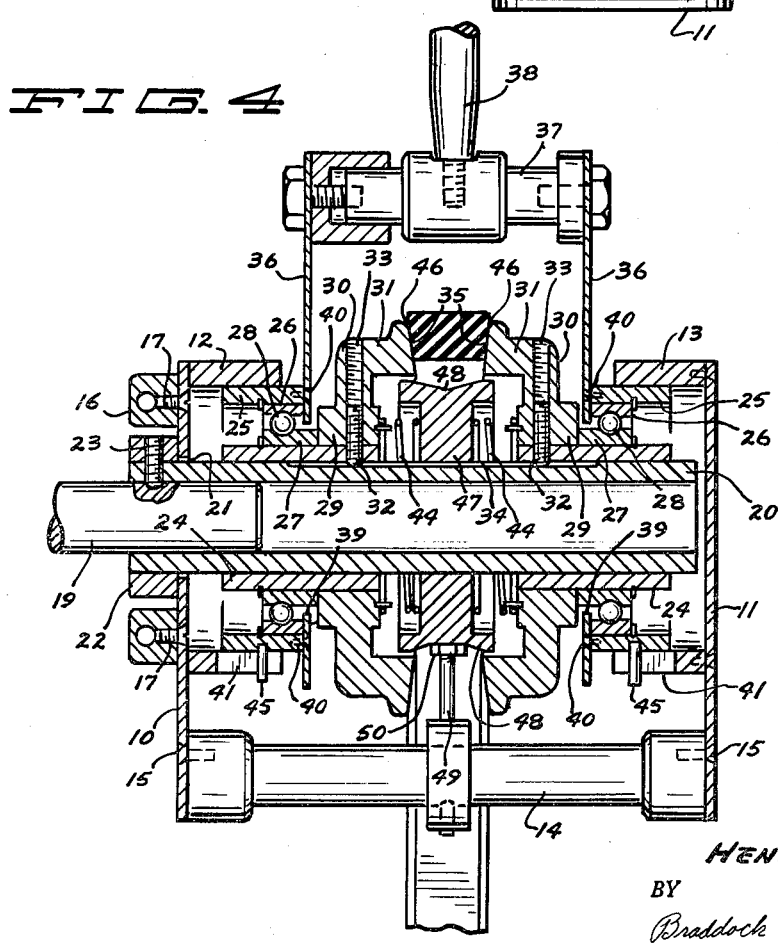
INVENTOR.
HENRY L. BARNES
BY
Braddock and Braddock
ATTORNEYS

United States Patent Office 2,987,933
Patented June 13, 1961

---

2,987,933
PULLEY
Henry L. Barnes, 1406 W. Lake St., Minneapolis, Minn.
Filed Jan. 11, 1960, Ser. No. 1,744
5 Claims. (Cl. 74—230.17)

The invention herein has relation to a pulley of novel and improved construction. As herein illustrated and described the pulley is adapted for use as a drive pulley but it also can be employed an an idler.

In the accompanying drawings forming a part of this specification,

FIG. 1 is a plan view of a pulley made according to the invention as when applied to use, parts of the disclosure being shown in section and other parts being broken away;

FIG. 2 is an elevational view of the disclosure of FIG. 1 as it would appear from below on the sheet;

FIG. 3 is a view corresponding with the disclosure of FIG. 1 showing parts in different positions; and FIG. 4 is an enlarged sectional view, taken on line 4—4 in FIG. 2.

A supporting frame of or for the new and improved pulley includes spaced, parallel, alined end plates 10 and 11, annular members 12 and 13 at the inner sides of and rigid with inner surfaces of the end plates, respectively, and in spaced, parallel, alined relation to each other, a connecting rod or bar 14, in spaced, parallel relation to the annular members, rigidly connected, as at 15, to and between exterior extension portions of said end plates, respectively, and bracket members 16 secured, as at 17, against an outer surface of the end plate 10.

A bracket member 16 on the supporting frame is to be made rigid, as at 18, with a structure including a driven shaft 19 for the pulley. Said driven shaft is to be rigidly secured within an end portion of a hollow cylinder 20 of said pulley which is in spaced, parallel relation to the connecting rod or bar 14. As shown, said hollow cylinder extends from a position adjacent to the end plate 11 of the frame freely through an annular opening 21 in and to a position outwardly of the end plate 10. A collar 22 on the end portion of the hollow cylinder 20 in which the driven shaft is situated, at the outer side of said end plate 10, is made rigid with said hollow cylinder by a fastening screw 23 which also fixedly secures the hollow cylinder upon and to the driven shaft 19.

Hollow tubular elements, each denoted 24, are mounted on opposite end portions, respectively, of the hollow cylinder 20 for longitudinally slidable movement toward and away from each other, and hollow tubular members, each indicated 25, are mounted in inner end portions of the annular members 12 and 13, respectively, for inward and outward sliding movement and movement of rotation relative to internal surfaces of said annulars members. The hollow tubular elements and members 24 and 25 at each end of the pulley are in alinement transversely thereof.

Ball bearings of or for the pulley, spaced apart in direction longitudinally of the hollow cylinder 20, are of duplicate construction. As shown, each ball bearing consists of an exterior annular element 26, an interior annular element 27 and circumferentially spaced balls 28 between said exterior and interior annular elements. The exterior and interior annular elements of each ball bearing are in alinement transversely of the pulley, the external surface of said exterior annular element of each ball bearing engages the internal surface of and is rigid with the corresponding hollow tubular member 25 and the internal surface of said interior annular element of each ball bearing engages the external surface of and is rigid with the corresponding tubular element 24.

A body of the pulley is constituted as a pair of duplicate body members, except that one is right and the other is left, spaced apart longitudinally of the hollow cylinder. Each body member includes a hub 29 supported on an inner end portion of the hollow tubular element 24 at the corresponding end of the pulley, an annular piece 30 integral with the hub and extending exteriorly thereof and an inwardly extending annular flange 31 integral with an exterior margin of the annular piece. Each body member is made rigid with the hollow tubular element 24 on which supported by means of a screw member 32 in an aperture 33 through the corresponding annular piece and hub which passes through said hollow tubular element and enters a longitudinal slot 34 in the hollow cylinder 20. The interior end portions of said screw members function as keys which are slidable along the longitudinal slot and preclude rotation of the hollow tubular elements, the interior annular elements 27 of the ball bearings and the body members of the pulley relative to the hollow cylinder 20 thereof. Stated otherwise said hollow cylinder, hollow tubular elements, interior annular elements and said body members are to be rotatable as a unit, relative to the hollow tubular members 25 and the exterior annular elements 26, in response to rotation of the driven shaft 19.

The annular flanges 31 are in perpendicular relation to the annular pieces 30 of the body members, respectively, of the pulley, and inner annular end surfaces, each denoted 35, of said annular flanges are in spaced, facing relation in a single circumference. Also, said inner annular end surfaces diverge in direction exteriorly of the pulley in equal angular relation to the hollow cylinder 20 thereof.

A manipulating handle for the pulley, at a side thereof spaced from the connecting rod or bar 14, includes spaced parallel actuator arms, each represented 36, in perpendicular relation to and situated between the hollow tubular members 25 and the hubs 29, respectively, a detachable cross member 37 in spaced relation to the body of the pulley and in parallel relation to the hollow cylinder 20 thereof and a hand piece 38 rigid with said cross member. Each of the actuator arms 36 is flexible widthwise thereof, longitudinally of said hollow cylinder, an interior end portion of each actuator arm has a circular opening 39 therethrough freely receiving the interior annular element 27 of the ball bearing at the corresponding end of the pulley, and the inner end of each hollow tubular member 25 is secured, as at 40, to an annular portion of the corresponding actuator arm in surrounding relation to the circular opening 39.

An inner end portion of each of the annular members 12, 13, rigid with the end plates 10 and 11, respectively, is cut away to provide an oblique surface 41 which extends circumferentially of the annular member and slants outwardly from right to left in FIGS. 1 and 3 of the drawings, and opposite end surfaces 42 and 43 which are in perpendicular relation to said end plates and contiguous with opposite ends, respectively, of said oblique surface. The oblique surfaces 41 are of equal length, in equal angular relation to the end plates 10, 11, respectively, and the opposite end surfaces 42 and 43, respectively, are in alined relation longitudinally of the hollow cylinder 20 and in direction endwise of the pulley. Compression coil springs 44, within the pulley between the body members thereof and in surrounding relation to said hollow cylinder, normally urge said body members apart, together as a unit with the hollow tubular elements 24, hollow tubular members 25 and ball bearings at the opposite ends, respectively, of the pulley.

Each of the hollow tubular members 25 rigidly supports a lug 45 which extends exteriorly therefrom and lies in the cutaway portion of the annular member, 12 or 13, at the corresponding end of the pulley, and the compression coil springs 44 normally will cause the body members of the pulley to be at their farthest distance apart with the lugs 45 engaged against the inner end portions of the oblique surfaces 41 and the end surfaces 43 bounding said cut-away portions, as disclosed in FIG. 3.

A belt to be ridable on the inner annular end surfaces 35 of the pulley body members, as in FIGS. 1 and 4 of the drawings, essentially includes opposite side surfaces, each denoted 46, which slant exteriorly in equal angular relation to the hollow cylinder 20 and are complementary to said inner annular end surfaces, respectively.

As shown, a support for the belt, when the pulley body members are at their farthest distance apart, as in FIG. 3, is constituted as a member 47 within which the hollow cylinder 20 is rotatable having a rim 48 at the interior side of the annular flanges 31 and the belt and alined therewith. A holder for retaining the support in fixed relation to the frame while said hollow cylinder rotates within the member 47, is constituted as a shank 49 rigid with the connecting rod or bar 14 having a head 50 secured to the rim 48 of said support. Obviously, the central portion of the support 47 could be cut away and a coil spring, such as 44, could extend between the different body members. Or, the shank 49 with head 50 could be omitted and the hollow cylinder 20 permitted to rotate freely in the support.

The cross member 37 of the manipulating handle is to be detached from the spaced actuator arms thereof when a belt is to be applied or removed, and thereafter replaced.

The parts of the pulley will be situated as in FIG. 3 of the drawings when the belt is to remain idle. As there shown, said belt is loose and resting upon the support in spaced relation to the inner annular end surfaces 35 of the body members of the pulley.

The manipulating handle will be actuated to the position as in FIGS. 1, 2 and 4 when the belt is to be driven. As there shown said belt is tensioned and in spaced relation to the support. The side surfaces 46 of the belt are pressingly engaged between and against said inner annular end surfaces 35.

It will be evident that when the driven shaft 19 is rotated, the hollow cylinder 20, the hollow tubular elements 24, the interior annular elements 27 of the ball bearings and the body members of the pulley will rotate therewith as a unit relative to the fixed frame, the hollow tubular members 25, the exterior annular elements 26 and the belt support of or for said pulley.

The pulley also can be constructed as an idler. In such event, the drive shaft 19 desirably would be omitted, and the body members of the pulley would be rotated in response to advancement of the belt with the opposite side surfaces thereof pressingly engaged against the inner annular end surfaces of said body members, as in FIGS. 1 and 4 of the drawings.

What is claimed is:

1. The combination with a supporting frame including spaced, parallel end plates, annular members at the inner sides of and rigid with said end plates, respectively, and in spaced, parallel and alined relation to each other and means for rigidly interconnecting said end plates, of a pulley including a cylinder in spaced, concentric relation to and surrounded by said annular members, ball bearings each constituted as an exterior annular element, an interior annular element and circumferentially spaced balls between said exterior and interior annular elements spaced apart longitudinally of said cylinder, the exterior and interior annular elements of each ball bearing being in alinement transversely of said pulley, said exterior annular elements of said ball bearings being mounted in the annular members, respectively, for inward and outward sliding movement and limited movement of rotation relative to said annular members and said interior annular elements of the ball bearings being mounted on opposite end portions, respectively, of said cylinder at the inner sides of said end plates, a pulley body constituted as a pair of right and left body members spaced apart longitudinally of said cylinder, each of said body members including a hub rigid with the interior annular element of the ball bearing at the corresponding end of the pulley, an annular piece extending exteriorly of said hub and an inwardly facing annular surface bounding an exterior margin of said annular piece, the body member and interior annular element of the ball bearing at each end, respectively, of said pulley constituting a unit rotatable relative to the exterior annular elements of said ball bearings and slidable longitudinally of said cylinder, means securing said units to the cylinder to be rotatable therewith, said inwardly facing annular surfaces being in spaced, facing and exteriorly diverging relation and in a single circumference, an inner end portion of each of said annular members providing an inwardly facing surface extending circumferentially of the annular member in slanting relation to the corresponding end plate, said slanting surfaces being in alined relation longitudinally of said cylinder and endwise of the pulley and in equal angular reverse relation to said end plates, a lug rigid with each of said exterior annular elements engageable with the slanting surface at the corresponding end of said pulley, said lugs being in alinement longitudinally of the cylinder and endwise of said pulley, and manually actuable means for rotating the exterior annular elements relative to the annular members to move the lugs longitudinally of the slanting surfaces.

2. The combination as specified in claim 1, and means urging said body members aparts.

3. The combination with a supporting frame including spaced, parallel end plates, annular members at the inner sides of and rigid with said end plates, respectively, and in spaced, parallel and alined relation to each other and means for rigidly interconnecting said end plates, of a pulley including a cylinder in spaced, concentric relation to and surrounded by said annular members, hollow tubular members mounted in inner end portions of the annular members, respectively, for inward and outward sliding movement and limited movement of rotation relative to said annular members, hollow tubular elements mounted on opposite end portions, respectively, of said cylinder at the inner sides of said end plates, the hollow tubular members and elements at each end, respectively, of the pulley being in alinement transversely thereof, ball bearings spaced apart longitudinally of the cylinder, there being a ball bearing between the hollow tubular member and element at each end of said pulley, each ball bearing being constituted as an exterior annular element, an interior annular element and circumferentially spaced balls between said exterior and interior annular elements, the exterior and interior annular elements of each ball bearing being in alinement transversely of the pulley, the exterior surface of said exterior annular element of each ball bearing being in engaged relation with the internal surface of and rigid with the hollow tubular member and the interior annular element of each ball bearing being in engaged relation with the external surface of and rigid with the hollow tubular element at the corresponding end of said pulley, a pulley body constituted as a pair of right and left body members spaced apart longitudinally of said cylinder, each of said body members including a hub rigid with an inner end portion of the hollow tubular element at the corresponding end of the pulley, an annular piece extending exteriorly of said hub and an inwardly facing annular surface bounding an exterior margin of said annular piece, the body member, hollow tubular element and interior annular element of the ball bearing at each end, respectively, of said pulley constituting a unit rotatable relative to the exterior annular elements of said ball bearings and slidable longitudinally of said cylinder, means securing said units to the cylinder to be rotatable therewith, said inwardly facing annular surfaces being in spaced, facing and exteriorly diverging relation and in a single circumference, an inner end portion of each of said annular members providing an inwardly facing surface extending circumferentially of the annular member in slanting relation to the corresponding end plate, said slanting surfaces being in alined relation longitudinally of said cylinder and endwise of the pulley and in equal angular reverse relation to said end plates, a lug rigid with each of said hollow tubular members engageable with the slanting surface at the corresponding end of said pulley, said lugs being in alinement longitudinally of the cylinder and endwise of said pulley, and manually actuable means for rotating the hollow tubular members relative to the annular members to move the lugs longitudinally of the slanting surfaces.

4. The combination as specified in claim 3, and means within the pulley between the body members thereof resiliently urging said body members apart.

5. The combination as specified in claim 1, and a support relative to which said cylinder is freely rotatable disposed interiorly of, adjacent to and in alinement with an annular space between said interiorly facing annular surfaces.

References Cited in the file of this patent

UNITED STATES PATENTS

| | | |
|---|---|---|
| 1,068,188 | Vincent | July 22, 1913 |
| 1,683,374 | White | Sept. 4, 1928 |
| 1,975,961 | Lindeman | Oct. 9, 1934 |
| 2,050,358 | McElroy et al. | Aug. 11, 1936 |

FOREIGN PATENTS

| | | |
|---|---|---|
| 28,532 | Great Britain | Nov. 17, 1904 |
| 557,884 | France | Oct. 27, 1922 |
| 202,412 | Austria | Mar. 10, 1959 |